March 7, 1944. E. B. HUDSON 2,343,671
SCREW DOWN MECHANISM FOR ROLLING MILLS
Filed Jan. 28, 1941 6 Sheets-Sheet 1

FIG. 1.

Inventor
EDWIN B. HUDSON.
Allen & Allen
Attorneys.

Patented Mar. 7, 1944

2,343,671

UNITED STATES PATENT OFFICE 2,343,671

SCREW-DOWN MECHANISM FOR ROLLING MILLS

Edwin B. Hudson, Middletown, Ohio, assignor to The American Rolling Mill Company, Middletown, Ohio, a corporation of Ohio Application January 28, 1941, Serial No. 376,366

15 Claims. (Cl. 80—56)

My invention pertains to improvements in motorized screw downs used on rolling mills to adjust the position of the mill rolls. In motorized screw downs the need for adjustment of the two screws relative to each other has been realized. The concurrent variation of both screws affects the average gauge of the piece, as will be understood; but where the screws are not properly adjusted relative to each other, the work piece will not have a desirable cross sectional contour and will be characterized by that curvature known as "camber," as well as other defects. Hereinafter I refer to the concurrent variation of both screws as "gauge control," and the relative variation of the screws to each other as "camber control," it being understood that these are terms of convenience and are intended to embrace all of the effects and purposes of the two types of adjustment.

Conventional screw down structures either provide two screw down motors and a connecting magnetic clutch, or a single screw down motor and two magnetic clutches operable to connect the motor selectively with either screw or with both. In the mechanism comprising two motors and a connecting magnetic clutch, gauge control is effected by concurrently operating the two motors in either direction with the clutch engaged. When one screw requires separate adjustment, the magnetic clutch is disengaged and the motor for that screw is operated until adjustment is effected. Then the clutch is re-engaged so that the apparatus may be used for gauge control. The operation of the apparatus employing a single motor and two magnetic clutches, is quite similar. When both clutches are engaged, the operation of the motor effects overall gauge control. If the clutch which connects the motor to one of the screws is disengaged the operation of the motor turns the other screw for camber control.

There are certain deficiencies in both of these systems, and the magnetic clutches themselves introduce certain serious disadvantages. These difficulties principally arise from clutch slippage. This may occur when the screw down motor starts before the magnetic flux has built up sufficiently in the clutch. Again, slippage may occur due to rapid acceleration of the motor or motors when the clutch or clutches are engaged; and in the two-motor type, slippage may occur when one motor starts and gets up to speed before the other. Thus it will be seen that these systems are likely to be productive of misalignment in their operation, and by the same token, the misalignment is more difficult to cure. It is true that time delay means to hold up the starting of the motors until the flux in the clutches has reached maximum have been employed; but such means delay the overall action of the systems. Thus these systems are not appropriate for the adjustment of mills during operation; and this difficulty becomes quite serious, for example, on mills operating at the not uncommon speeds of 1500 to 2000 feet per minute.

Another difficulty is that the rate of adjustment for gauge control and camber control is the same in these systems. In an ideal system the camber control adjustment should be much slower in operation than the gauge adjustment, but should be equally rapid in response. The reason for this is that the extent of relative adjustment required for camber control is very slight compared to the extent of adjustment required for a significant gauge change. Camber adjustment should be made slowly to straighten the strip, especially on hot strip mills. It is a delicate adjustment and is made while the operator watches the strip to see when it becomes straight. The same thing would be true of a single stand cold mill; but on tandem cold mill trains tension may tend to correct camber while the need for proper relative adjustment of the screws for contour remains the same.

In the conventional screw down systems the correction of one screw is made with reference to the mill housing, and not with reference to the other screw. By this I mean that when one screw is being adjusted, it and its controlling mechanism is divorced entirely from the other screw and must be reconnected with it if gauge control is to be effected. Thus if any slippage of the clutch occurs at the moment of re-engagement, or at the start of a gauge adjustment, a new camber is introduced which again must be corrected, and so on. Repeated adjustments are thus the rule both in obtaining initially correct working conditions and in correcting new errors introduced by sporadic variations in gauge or temperature of the work piece and in mill temperatures.

Among the principal objects of my invention are the provision of a motorized screw down means in which the clutches and their attendant difficulties are eliminated, the provision of a screw down mechanism which is at all times operative with both screws so that individual screw adjustment is made with reference to the other screw and not with reference to the mill housing, and so that the maladjustments which are likely to occur at the time of re-engagement of parts are eliminated, and the provision of a mechanism permitting camber control at an appropriate rate slower than the rate of gauge adjustment.

These and other objects of my invention which will be set forth hereinafter or will be apparent to one skilled in the art upon reading these specifications, I accomplish by that certain construction and arrangement of parts of which I shall now describe an exemplary embodiment. Reference is made to the accompanying drawings wherein—

Briefly in the practice of my invention, I provide a single main driving motor for the screw down, which is coupled to both screws and remains so coupled at all times. In the coupling, however, from this motor to each screw I include a gear motor which can either drive its screw independently of the rotation of the shaft of the main motor or can be employed to change the rotative effect of the main motor shaft on the particular screw. Whether the gear motor independently drives its screw or merely changes the rate of rotation of its screw, it is coupled at all times with the shaft of the main motor which in turn is at all times coupled with the other screw. There is no effect of engagement or disengagement in my device. It will further be clear as the description proceeds, that it is possible with my device concurrently to vary the camber and the gauge, and the skilled operator will avail himself of this advantage. Even where this is not done, however, and where the desired gauge is attained before the relative adjustment of the screws is attempted, the adjustment of one screw will always be with reference to the other screw, because of the aforesaid continuous connection.

Figure 3:
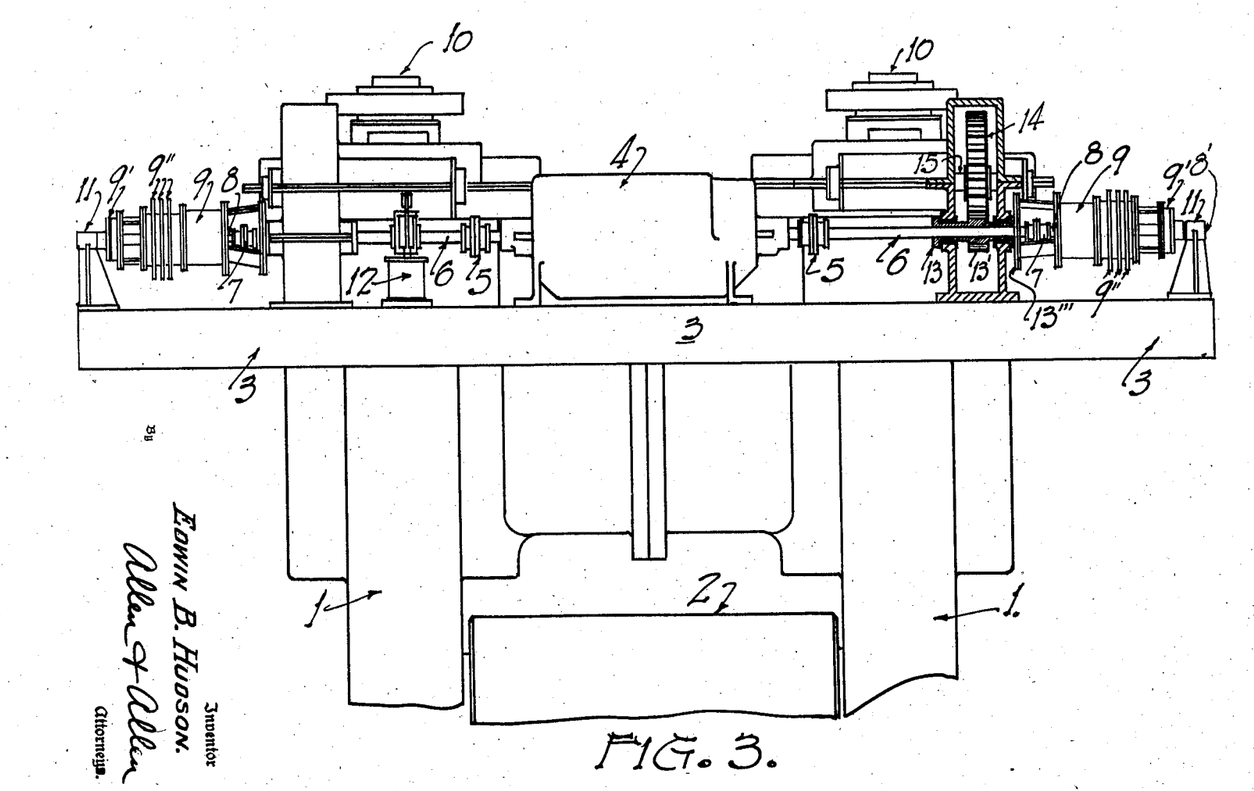
Fig. 3 is an elevational view of the assembly of the operating parts of the mill housings, and certain controlled parts in section.
Figure 4:
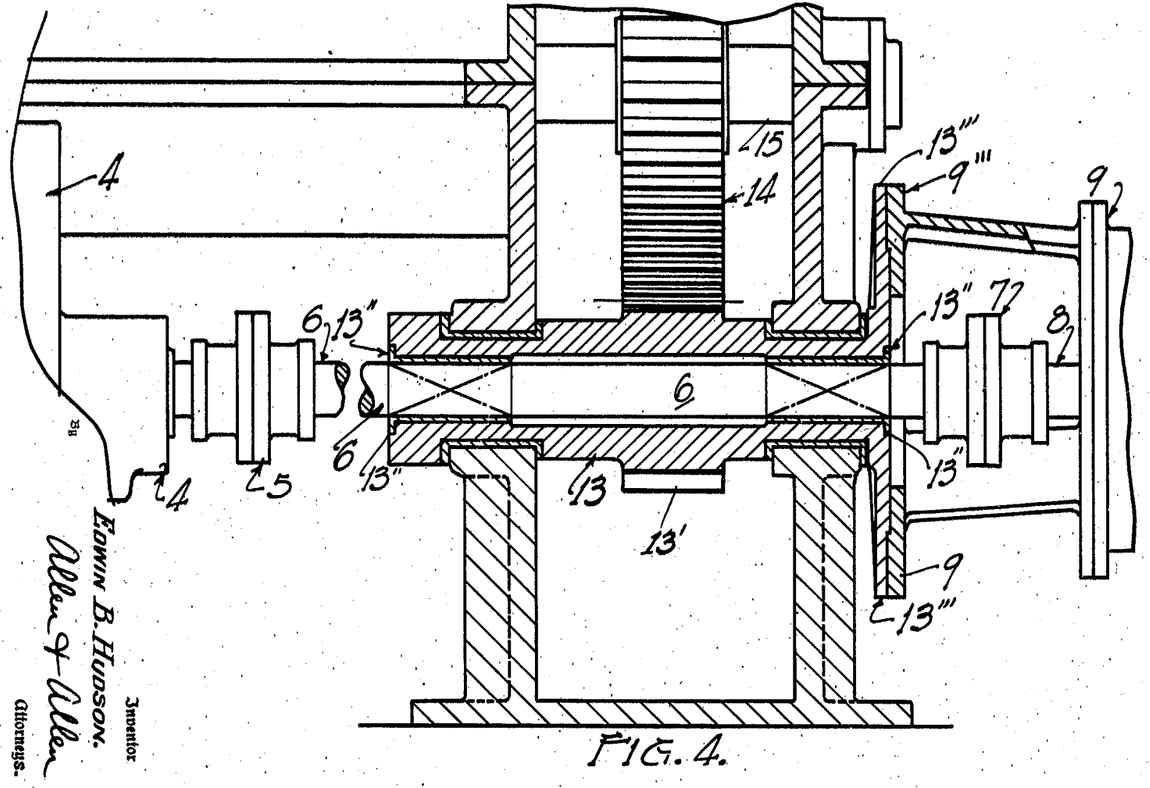
Fig. 4 is a sectional view on a larger scale of certain of the mechanical elements employed by me.

The mill housing is indicated at 1, and in Fig. 3 I have shown at 2 one of the mill rolls. If the mill is a four high mill this will be one of the backing rolls. The mill housings are surmounted by a screw down platform 3 upon which elements of the motorized screw down are mounted.

The main driving motor for the screw down is indicated at 4. This motor has its shaft at each end coupled by couplings 5 to shafts 6. Upon these shafts there are rotatably mounted sleeves 13 carrying pinions 13' meshing with gears 14 on shafts 15. The shafts 15 bear worms 16 meshing with worm gears 17 on shafts 18 which also bear pinions 19. These pinions mesh respectively with gears 20 mounted on the squared ends of the mill screws 10. The gearing thus far described may be and preferably will be enclosed in suitable housings.

The sleeves 13 (indicated as rotatably mounted on the shafts 6) are connected for operation to these shafts through the intermediary of gear motors 9. By a gear motor I mean an electric motor having a built-in speed reduction gearing. Preferably the gearing is of the heliocentric type so that the power shaft will be in line with the motor shaft. The gear motors are indicated generally at 9 and in the form shown comprise connected housings, one of which contains the motor and the other of which contains the gearing. The shafts 6 are respectively connected to the shafts 8 of the gear motors by couplings 7. The shafts 8 are shown as the power shafts, i. e., the shafts which connect with the gearing of the motor. The motor armature shafts 8' extend beyond the other ends of the gear motors and are mounted on the screw down platform 3 in bearings 11. Thus the entire gear motors are mounted for rotation on the shafts 8 and 8'. For the delivery of power to the gear motors I provide collector rings 9'' mounted upon the gear motor and adapted to be contacted by brushes (not shown). I also provide on my gear motors magnetic means 9' in the nature of a magnetic brake or lock for locking the shaft 8' of the motor to the frame of the motor. The clutch 9' is so arranged as to be locked unless its gear motor is energized through the collector rings 9'', but upon such energization the brake 9' is magnetically released.

The gear motors are provided with frame extensions 9''' adapted for direct attachment to flanges 13''' forming part of or mounted upon the sleeves 13. It will be understood from this structure that when a gear motor is not energized its shaft 8' is locked and as a consequence the sleeve 13 is locked with respect to the shaft 6 so as to turn at the same speed. But if the gear motor be energized for driving either in the forward or reverse direction, the sleeve 13 will be caused to turn either faster or slower than the shaft 6. Moreover, if the shaft 6 be stationary, the energization of the gear motor will cause the sleeve 13 to be rotated and to run its particular screw either up or down, depending upon the direction of operation of the gear motor. The gear motors 9 are smaller motors than the main motor 14 and the gearing acts to bring the torque of these motors to the same or approximately the same value as the torque of motor 4. But if the several motors operate at nearly the same speeds, it will be clear that by reason of the reduction gearing, any operation of the screws produced by the gear motors 9 will be at a slower rate than an operation of the screws produced by the motor 4. In ordinary practice in my structure I cause the individual screw down rate to be about one-fifth to one-seventh of the screw down rate produced by the main driving motor when the gear motors are not being driven.

The sleeve 13 is provided with bearings 13'' to support the shaft 6.

Figure 1:
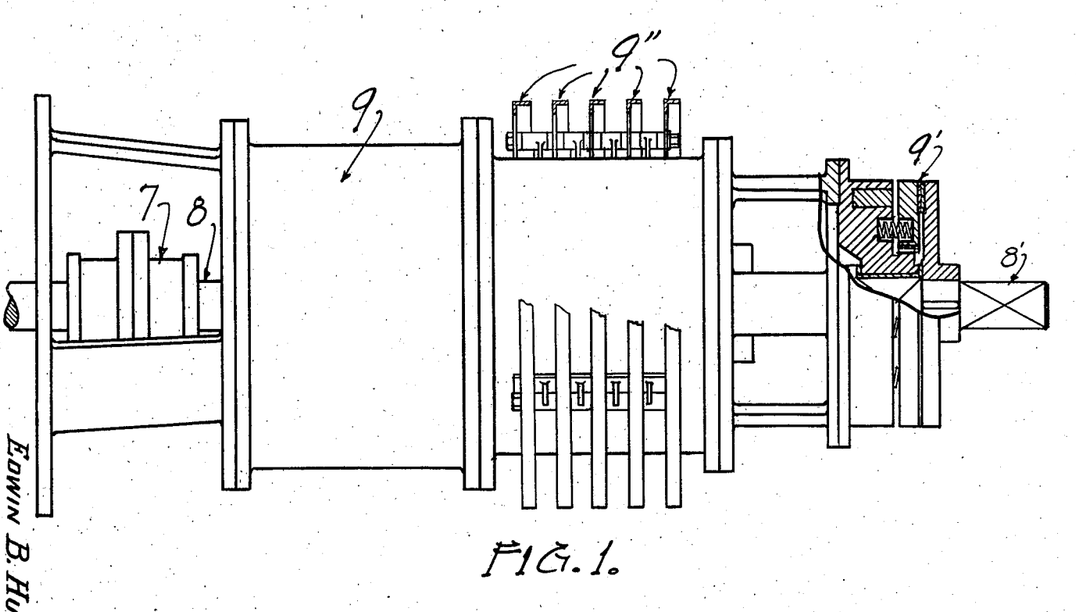
Figure 1 is an elevational view with parts in section showing a gear motor as hereinafter described.
Figure 2:
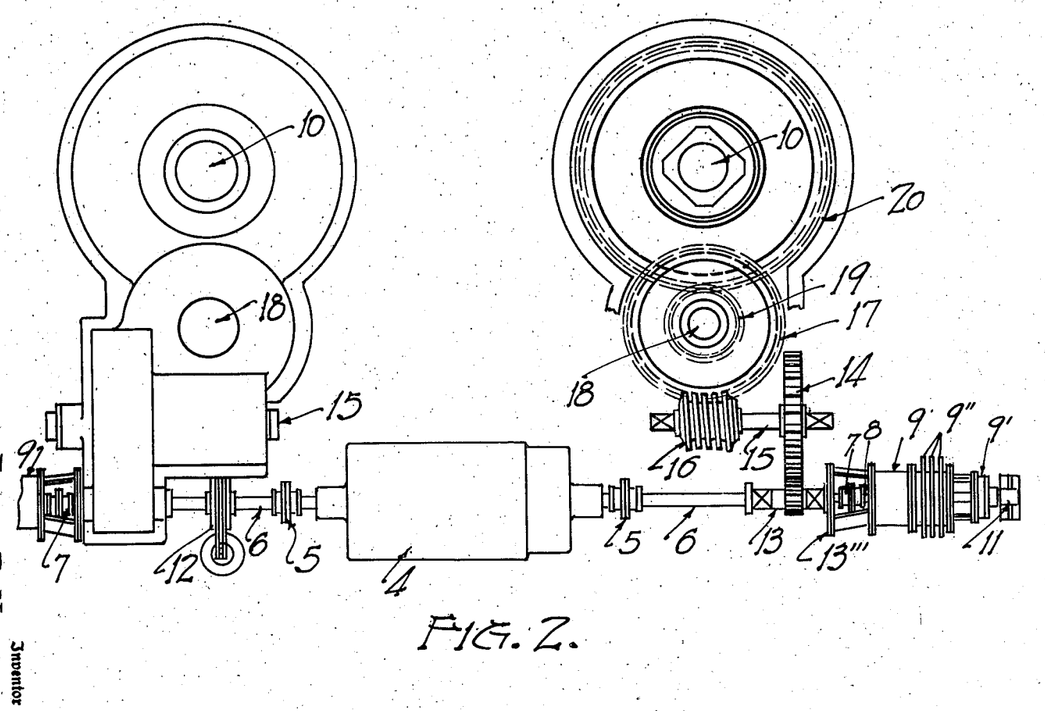
Fig. 2 is a plan view of a screw down assembly.

The drives to the screws from the main motor 4, involving as they do a worm and worm wheel, are substantially self-locking; but for extra assurance against a variation of one screw while the other is being separately adjusted, I prefer to provide at least one of the shafts 6 with a magnetic brake 12 indicated in Figs. 2 and 3. This brake is so connected to the circuits of the main motor 4 as to be magnetically released when the motor 4 is energized, but to lock it as soon as power is cut off from the motor 4.

Figure 5:
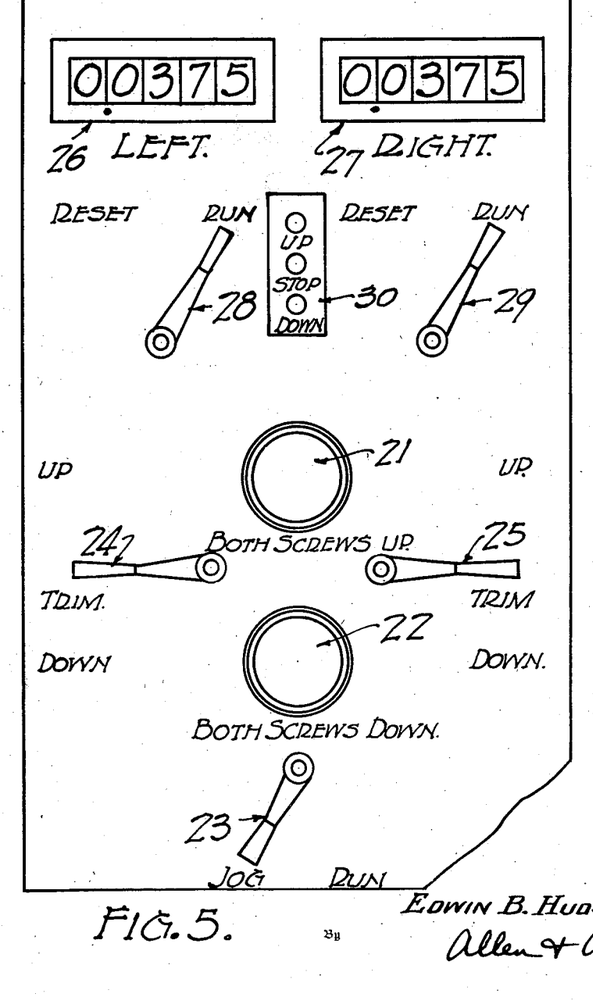
Fig. 5 is an elevational view of a control panel.

The magnetic brake 12 from the shaft 6 holds that shaft and the low speed shaft 8 stationary when the motor 4 is stationary. When the revolving unit 9 is rotating, the sleeve 13 is advanced in relation to the shaft 6 or vice versa, and the power reaction is taken by the brake 12 through the shaft 6. The revolving unit 9 only changes the angular relationship between the shaft 6 and the sleeve 13; but this can occur either when the shaft 6 is stationary or when it is rotated by the motor 4. In Fig. 5 I have indicated the type of control panel which I prefer to use. The main screw down motor 4 is operated in a direction to run the screws upwardly by a push button 21 so marked on the control panel. A push button 22 is connected with the motor 4 in such a way as to operate it in the opposite direction to run both screws down. The control lever 23 is left in "jog" position during adjustment operations. It may be shifted to "run" position in making any great change in roll clearance, as when changing rolls in the mill. The gear motors 9 for trimming either screw independently are arranged for control by spring levers 24 and 25. These levers are normally held in the "off" position, but may be moved upwardly to operate their respective gear motors to raise the screws, or downwardly to operate their respective gear motors to lower the screws individually. Each gear motor will operate so long as its respective lever 24 or 25 is held by the operator in the up or down position, but will stop as soon as the lever is released. Indicators for the setting of the right and left hand screws are shown at 26 and 27. These and the indicator reset levers 28 and 29 together with the push button arrangement 30 do not constitute a part of this invention, but are shown to illustrate a complete control panel.

Now it will be clear, that while I have employed certain magnetic brakes or locking means, there never is any interruption of the connection between the motor 4 and the two screws; there is never any interruption of the connection from one screw to the other through the motor 4, and the gear motors are always locked excepting when being energized to secure a different speed of rotation between shaft 6 and sleeve 13. As a consequence, no adjustment of either screw will have any tendency to bring the other screw out of adjustment or any tendency to introduce new errors due to slippage of the parts.

In the operation of effecting an adjustment for gauge the motor 4 may be operated by means of the push buttons 21 or 22 to run the screws up or down concurrently. As soon as the motor 4 is operated, the magnetic brake 12 is released. But the gear motors 9 are locked so long as they are not independently energized. Thus the power of the motor 4 is applied to both screws through a positive mechanical drive to effect the same operation of both screws. When an adjustment has in this way been made for gauge, then if the two screws 10 are out of adjustment with each other, either the right hand or left hand gear motor may be operated by means of the levers 24 or 25, and in either direction, to effect the adjustment. As soon as a gear motor is energized its magnetic lock 9' is released. The gear motor so energized can thus run its individual screw up or down as desired without affecting the other screw and without interrupting the mechanical connection between the screws. Hence the screws cannot come out of the desired relationship with each other so as to produce new camber difficulties. Moreover, the adjustment of one screw is always made with respect to the other screw and not with respect to the housing, albeit shaft 6 will be locked if motor 4 is not energized at the same time. It will be clear, furthermore, that the skilled operator will be able to make camber adjustments at the same time that he makes gauge adjustments if he so desires. The camber adjustment is made at a much slower rate than the gauge adjustment, adapting my mechanism to use under circumstances where the straightening of the piece must be carefully watched. In setting out to correct for camber, the experienced operator will know from his gauge requirements and from experience (assuming for example, that the left hand screw is too far down with respect to the right hand screw) whether to raise the left hand screw or lower the right hand screw or to do both concurrently.

Figure 6:
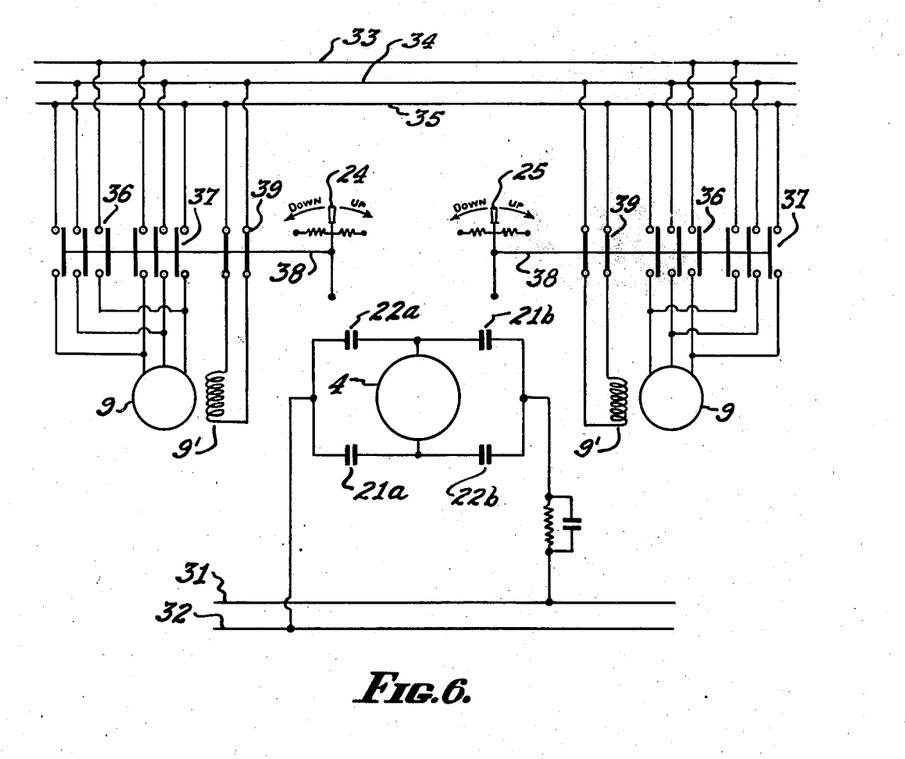
Fig. 6 is a wiring diagram.

In the wiring diagram of Figure 6, I have indicated power lines 31 and 32 as a source of direct current for energizing the main motor 4. The motor 4 is connected to these lines through a reversing circuit in which is contained two pairs of contacts 21a, 21b and 22a, 22b. The contacts 21a and 21b are associated with the push button 21 of the control panel and will be closed, so as to establish a circuit through the motor 4, when that button is depressed. Thus, the motor may be operated in a direction of rotation suitable for lifting the screws. When the pair of contacts 22a and 22b are closed, as by depressing the push button 22 of the control panel with which these contacts are associated, the current will flow through the field of the motor in a relative reverse direction, thus reversing the rotation of the motor and causing the screws to be lowered.

For energizing the gear motors 9 and the clutches 9¹, I have indicated a source of current supplied by the lines 33, 34 and 35. Each of the motors 9 is supplied by these lines through a suitable circuit containing a pair of reversing switches 36 and 37. These switches, together with a third switch member 39, are commonly mounted on a rod or bar 38, which, in turn, is operably associated with a manual control lever carried on the control panel.

The switches 36 and 37 are normally in open position, as shown, so that no current is supplied to the gear motors 9. The switches 39, however, are normally closed so that the current is supplied to the clutches 9¹, holding them engaged for purposes previously disclosed. By shifting the lever 24 to the left, from the position seen in Figure 6, the bar 38 and the switch elements mounted thereon will be moved to the left also. This shifting of the members will result in closing the switch 36 to thus energize the motor 9 and drive the left screw downward. Also, the switch 39 will be moved to an open position breaking the circuit to, and disengaging, the clutch 9¹. If the lever 24 be shifted to the right, the switch 39 will again be opened, to de-energize the clutch, while the switch 37 will be moved to closed position establishing a new circuit to the motor 9, to drive it in reverse rotation sewing to lift the screw. The lever 25 operates in a similar manner to open and close the switches 36, 37 and 39 which, in turn, control the motor 9 and the clutch 9¹ at the right side of Figure 6.

Modifications may be made in my invention without departing from the spirit of it.

Having thus described my invention, what I claim as new and desire to secure by Letters Patent:

1. In a screw down device for a mill having a pair of screws, a driving motor, continuously effective mechanical connections between said motor and each of said screws, at least one of said connections comprising a separately excitable motor having relatively movable parts each of which is included in said connection, said motor being operable independently of said main driving motor to drive one of said screws.

2. In a screw down device for a mill having a pair of screws, a driving motor, continuously effective mechanical connections between said motor and each of said screws, at least one of said connections comprising a separately excitable motor having relatively movable parts each of which is included in said connection, said motor being operable independently of said main driving motor to drive one of said screws, said motor having as a part of said connection a speed reducing gearing whereby operation of said screw by means of said last mentioned motor will be at approximately the same torque but at a different rate of speed from the operation of said screw as produced by said main driving motor.

3. In a screw down device for a mill having a pair of screws, a driving motor, continuously effective mechanical connections between said motor and each of said screws, at least one of said connections comprising a separately excitable motor having relatively movable parts each of which is included in said connection, said motor being operable independently of said main driving motor to drive one of said screws, said motor having as a part of said connection a speed reducing gearing whereby operation of said screw by means of said last mentioned motor will be at approximately the same torque but at a different rate of speed from the operation of said screw as produced by said main driving motor, and said last mentioned motor having a mechanical lock adapted to lock its armature when said motor is not energized.

4. In a screw down for a mill having a pair of screws, a main driving motor and a mechanical connection from said motor to each of said screws, at least one of said connections comprising a pair of rotative elements and a connection between said elements comprising a smaller electric motor having relatively rotatable parts respectively connected to said elements, and locking means for said motor, said locking means arranged to be released when said smaller motor is energized, whereby said smaller motor is adapted to effect a connection between said rotative parts acting as a direct transmission from said main driving motor to one of said screws, or to operate said screw independently when said main driving motor is de-energized.

5. In a screw down for a mill having a pair of screws, a main driving motor and a mechanical connection from said motor to each of said screws, at least one of said connections comprising a pair of rotative elements and a connection between said elements comprising a smaller electric motor having relatively rotatable parts respectively connected to said elements, and locking means for said motor, said locking means arranged to be released when said smaller motor is energized, whereby said smaller motor is adapted to effect a connection between said rotative parts acting as a direct transmission from said main driving motor to one of said screws, or to operate said screw independently when said main driving motor is de-energized, and means for locking said main driving motor, said means comprising a magnetic brake adapted to be released when said main driving motor is energized.

6. In a screw down for a mill having a pair of screws, a main driving motor and a mechanical connection from said motor to each of said screws, at least one of said connections comprising a pair of rotative elements and a connection between said elements comprising a smaller electric motor having relatively rotatable parts respectively connected to said elements, and locking means for said motor, said locking means arranged to be released when said smaller motor is energized, whereby said smaller motor is adapted to effect a connection between said rotative parts acting as a direct transmission from said main driving motor to one of said screws, or to operate said screw independently when said main driving motor is de-energized, said smaller motor being mounted for bodily rotation and comprising a speed reduction gearing whereby operation of said smaller motor will operate said screw at a different rate of speed from said main driving motor.

7. In a motorized screw down for a rolling mill having a screw, a main driving motor, a shaft directly connected with said motor, a sleeve mounted on said shaft, a driving connection between said sleeve and said screw, and a connection between said shaft and said sleeve comprising a gear motor having a gear shaft projecting at one end, a connection between said shaft and said first mentioned shaft, said motor having a frame, and a connection between said frame and said sleeve.

8. In a motorized screw down for a rolling mill having a screw, a main driving motor, a shaft directly connected with said motor, a sleeve mounted on said shaft, a driving connection between said sleeve and said screw, and a connection between said shaft and said sleeve comprising a gear motor having a gear shaft projecting at one end, a connection between said shaft and said first mentioned shaft, said motor having a frame, and a connection between said frame and said sleeve, said motor being mounted for rotation with said sleeve, and means for applying energizing current to said gear motor.

9. In a motorized screw down for a rolling mill having a screw, a main driving motor, a shaft directly connected with said motor, a sleeve mounted on said shaft, a driving connection between said sleeve and said screw, and a connection between said shaft and said sleeve comprising a gear motor having a gear shaft projecting at one end, a connection between said shaft and said first mentioned shaft, said motor having a frame, and a connection between said frame and said sleeve, said motor being mounted for rotation with said sleeve, and means for applying energizing current to said gear motor, said gear motor having an armature, and means for locking said armature whereby to provide a direct coupling between said first mentioned shaft and said sleeve, said locking means being of magnetic character and arranged to be released upon energization of said gear motor.

10. In a motorized screw down for a rolling mill having a screw, a main driving motor, a shaft directly connected with said motor, a sleeve mounted on said shaft, a driving connection between said sleeve and said screw, and a connection between said shaft and said sleeve comprising a gear motor having a gear shaft projecting at one end, a connection between said shaft and said first mentioned shaft, said motor having a frame, and a connection between said frame and said sleeve, said motor being mounted for rotation with said sleeve, means for applying energizing current to said gear motor, said gear motor having an armature, means for locking said armature whereby to provide a direct coupling between said first mentioned shaft and said sleeve, said locking means being of magnetic character and arranged to be released upon energization of said gear motor, and means for locking said first mentioned shaft, said locking means having magnetic release means adapted to be released upon energization of said main drive motor.

11. In a screw down device for a rolling mill having a pair of screws, a main driving motor and a motion transmitting connection from said motor to each of said screws, each of said motion transmitting connections comprising a pair of rotative parts and a coupling between said parts including a separately energizable electric motor having relatively rotatable parts each of which is included in said coupling, means for locking said last mentioned motors whereby to enable said main driving motor to drive said screws through said motion transmitting connections, and means for energizing said last mentioned motors separately whereby individually to operate individual screws.

12. In a screw down device for a rolling mill having a pair of screws, a main driving motor and a motion transmitting connection from said motor to each of said screws, each of said motion transmitting connections comprising a pair of rotative parts and a coupling between said parts, including a separately energizable electric motor having relatively rotatable parts each of which is included in said coupling, means for locking said last mentioned motors whereby to enable said main driving motor to drive said screws through said mechanical connections, and means for energizing said last mentioned motors separately whereby individually to operate individual screws, each of said last mentioned motors comprising a speed reduction gearing whereby the operation of said last mentioned motors effects the operation of said screws individually at slower rates.

13. In a screw down device for a rolling mill having a pair of screws, a main driving motor and a motion transmitting connection from said motor to each of said screws, each of said motion transmitting connections comprising a pair of rotative parts and a coupling between said parts including a separately energizable electric motor having relatively rotatable parts each of which is included in said coupling, means for locking said last mentioned motors whereby to enable said main driving motor to drive said screws through said mechanical connections, and means for energizing said last mentioned motors separately whereby individually to operate individual screws, each of said last mentioned motors comprising a speed reduction gearing whereby the operation of said last mentioned motors effects the operation of said screws individually at slower rates, and a control means for said screw down for effecting the operation of said main driving motor independently in either direction and for effecting the operations of said last mentioned motors separately and independently in either direction.

14. In a screw down device for a rolling mill having a pair of screws, a main driving motor and a motion transmitting connection from said motor to each of said screws, each of said motion transmitting connections comprising a pair of rotative parts and a coupling between said parts including a separately energizable electric motor having relatively rotatable parts each of which is included in said coupling, means for locking said last mentioned motors whereby to enable said main driving motor to drive said screws through said mechanical connections, and means for energizing said last mentioned motors separately whereby individually to operate individual screws, each of said last mentioned motors comprising a speed reduction gearing whereby the operation of said last mentioned motors effects the operation of said screws individually at slower rates, and a control means for said screw down for effecting the operation of said main driving motor independently in either direction and for effecting the operations of said last mentioned motors separately and independently in either direction, all of said motors having locking means so arranged as to be released when the appropriate motor is energized.

15. In a motorized screw down for a rolling mill having a pair of screws, a motion transmitting connection of continuous character between said screws, said motion transmitting connection including three motors in mechanical series, the central one of said motors being a main driving motor with a housing affixed to the mill, and outlying ones of said motors being supplementary driving motors for individual screws, wholly included as to all relatively rotatable parts in the said connection, and effective when said main motor is not in operation, and locking means for said main motor.

EDWIN B. HUDSON.